(12) United States Patent
Vogt (10) Patent No.: US 9,090,044 B2
(45) Date of Patent: Jul. 28, 2015

(54) PLASTIC CARD PRELAMINATE AND PLASTIC CARD STRUCTURE

(71) Applicant: Identive Group, Inc., Santa Ana, CA (US)

(72) Inventor: Werner Vogt, Remetschwil (CH)

(73) Assignee: Identive Group, Inc., Santa Ana, CA (US)

( * ) Notice: Subject to any disclaimer, the term of this patent is extended or adjusted under 35 U.S.C. 154(b) by 2 days.

(21) Appl. No.: 13/934,871

(22) Filed: Jul. 3, 2013

(65) Prior Publication Data

US 2015/0017369 A1 Jan. 15, 2015

(51) Int. Cl.

| | |
|---|---|
| *B32B 7/12* | (2006.01) |
| *B32B 27/08* | (2006.01) |
| *B32B 3/26* | (2006.01) |
| *G06K 19/077* | (2006.01) |

(52) U.S. Cl.
CPC . *B32B 7/12* (2013.01); *B32B 3/266* (2013.01); *B32B 27/08* (2013.01); *B32B 2405/00* (2013.01); *B32B 2519/02* (2013.01); *G06K 19/07722* (2013.01); *Y10T 428/14* (2015.01); *Y10T 428/1438* (2015.01); *Y10T 428/1443* (2015.01); *Y10T 428/1452* (2015.01); *Y10T 428/1476* (2015.01); *Y10T 428/24331* (2015.01)

(58) Field of Classification Search
CPC .......... B32B 7/12; B32B 3/266; B32B 27/08; B32B 2405/00; B32B 2519/02; G06K 19/07722; Y10T 428/14; Y10T 428/1452; Y10T 428/1476; Y10T 428/24331; Y10T 428/1438; Y10T 428/1443

See application file for complete search history.

(56) References Cited

U.S. PATENT DOCUMENTS

| | | | |
|---|---|---|---|
| 2003/0049403 A1* | 3/2003 | Crum et al. ................. | 428/42.3 |
| 2003/0178495 A1 | 9/2003 | Jones et al. | |
| 2008/0308641 A1 | 12/2008 | Finn | |
| 2010/0260985 A1 | 10/2010 | Hagemann et al. | |

FOREIGN PATENT DOCUMENTS

| | | |
|---|---|---|
| EP | 1756756 B1 | 8/2011 |
| WO | 2012062965 A1 | 5/2012 |

OTHER PUBLICATIONS (C1) International Search Report and Written Opinion from corresponding international patent application No. PCT/US2014/041865, dated Oct. 9, 2014.

\* cited by examiner

*Primary Examiner* — Patricia L Nordmeyer (74) *Attorney, Agent, or Firm* — Proskauer Rose LLP (57) ABSTRACT

Described herein are methods and apparatuses for manufacturing a pre-cut plastic card structure via laser cutting, having a plastic card, plastic card prelaminate and sticker separable from the plastic card structure. The plastic card prelaminate includes a first plastic sheet, a first adhesive layer arranged below the first plastic sheet, a release layer arranged below the first adhesive layer, a laser barrier layer arranged below the release layer, and a second plastic sheet arranged below of the laser barrier layer.

19 Claims, 6 Drawing Sheets

PLASTIC CARD PRELAMINATE AND PLASTIC CARD STRUCTURE

TECHNICAL FIELD

The subject matter of the application relates generally to a method for manufacturing a pre-cut plastic card structure and to plastic cards as well as plastic card prelaminates that are used in the method, and stickers that are separable from the plastic cards.

BACKGROUND

As the use of plastic cards for credit cards, identification cards and the like continues to become more widespread, credit card fraud and identification card fraud are becoming increasing problems. The ease in which criminals have been able to manufacture or manipulate current cards is a result of the existence of the easily-altered magnetic stripe storage medium used by current cards. These magnetic stripes are easy to program and reprogram using commonly available technology, resulting, e.g., in so-called magnetic stripe cloning.

Thus, there is a need in the plastic card industry to provide a more secure plastic card that is more difficult or nearly impossible to duplicate or manipulate. The likely successor to the magnetic stripe cards is known as a memory card or smart card. The smart card can generally be described as a card having an integrated circuit with memory that is capable of securely storing data and/or executing processing functions.

The most recent development in smart cards is a contactless card that interacts with a terminal reader using electromagnetic coupling. The smart card incorporates an inlay that is a symmetrical substrate incorporating a micro-chip bounded to an antenna and functioning as the heart of a radio-frequency identification (RFID) part, a near field communication (NFC) chip, or similar chip credential. This smart card requires only proximity to a reader antenna to communicate. Contactless technology is rapidly replacing traditional machine readable identification technologies in numerous applications such as those employing bar codes and magnetic stripes, offering substantially enhanced security and convenience.

Self-adhesive smart card labels are a special type of smart card for easily adding contactless smart card technology to any type of form factor. The labels contain a RFID or NFC chip and antenna and allow a user to encode and read them like a smart card. The labels are available in various shapes and sizes and may be used for access control, time and attendance, membership/loyalty programs, logical access, storage of biometric templates, parking, electronic purse, and many other applications requiring secure and reliable read/write cards.

Figure 1:
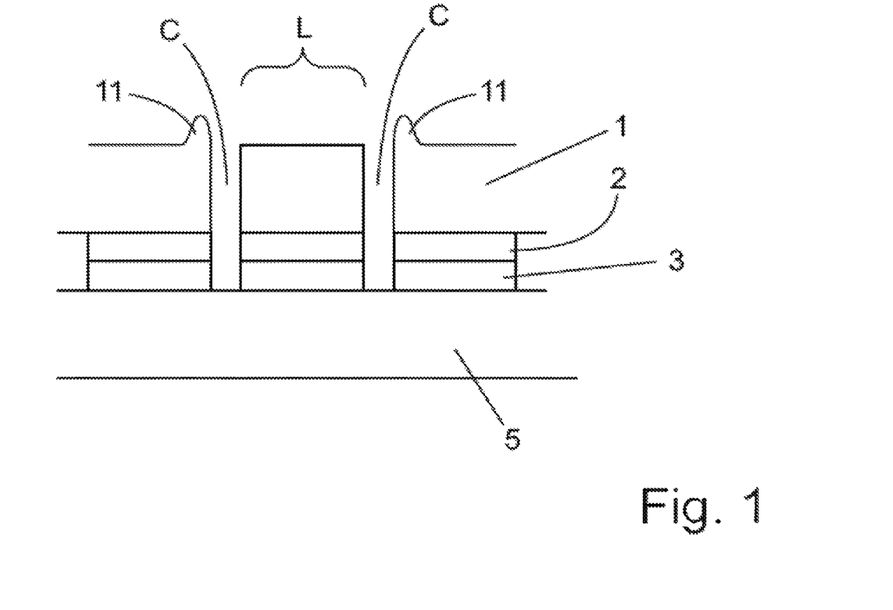
FIG. 1 shows a cross sectional view of a pre-cut plastic card according to the state of the art.

Some RFID phone stickers are provided as part of a plastic card and may be punched out for placement, for example on a mobile phone. Typically, such plastic cards are produced by a card manufacturer and may be personalized by the end application provider. The plastic cards require cut lines that separate the sticker from rest of the plastic card. A conventional phone sticker plastic card is shown in FIG. 1. A first plastic sheet 1 is provided on top of an adhesive layer 2 that is separated from a second plastic sheet 5 by a release layer 3. Cut lines C that are generated using a mechanical cutting tool separate a label area L of the first plastic sheet, the adhesive layer 2 and the release layer 3 from the rest of the plastic card. The label area L may comprise electronic elements like a MID chip and antenna. Because the mechanical cutting tool displaces the plastic material of the first plastic layer 1, elevations 11 are formed at the edges of the cut lines C. Said elevations 11 result in an uneven surface of the plastic card. This causes problems when transporting the plastic card through handling and printing devices for personalization of the plastic card and sticker.

SUMMARY

Therefore, what is needed is a method for manufacturing a pre-cut plastic card structure that avoids elevations on top of the plastic card so that the plastic card is easily transported through handling and printing devices for personalization.

The above objective is achieved by the methods and techniques described herein for manufacturing a pre-cut plastic card. The invention, in one aspect, features a method for manufacturing a pre-cut plastic card including providing a plastic card comprising at least two plastic sheets, a release layer and first adhesive layer where the release layer and the first adhesive layer are arranged between the plastic sheets, defining an area on the plastic card, and pre-cutting the defined area using a laser where the plastic card is pre-cut at least through one plastic sheet, the first adhesive layer and the release layer. In contrast to a mechanical cutting tool that displaces plastic material while cutting through a plastic card therefore producing elevations on top of the plastic card, a laser cutting tool thermally vaporizes removed material resulting in an even surface of the plastic card without any elevations.

In some embodiments, a surface of the plastic card is printed after pre-cutting the defined area. Because the method described herein results in a plastic card with an even surface, the plastic card is easily transported through a printing device for printing. This allows for a higher speed and better quality personalization of the plastic card.

The invention, in one aspect, features a plastic card prelaminate comprising a first plastic sheet, a first adhesive layer arranged below the first plastic sheet, a release layer arranged on below the first adhesive layer, a laser barrier layer arranged on below the release layer and a second plastic sheet arranged below the laser barrier layer. In some embodiments, the laser barrier layer comprises a material selected from the group consisting of aluminum and metalized plastic.

In some embodiments, each of the first plastic sheet and the second plastic sheet comprises a material selected from the group consisting of polyvinyl chloride, polyethylene terephthalate, polyester and acrylonitrile-butadiene-styrene.

In some embodiments, the release layer comprises a material selected from the group consisting of silicones and Teflon. In some embodiments, the first adhesive layer comprises a pressure sensitive adhesive.

In some embodiments, a composite structure is arranged in a through-hole of the first plastic sheet. The composite structure comprises a first plastic layer including at least one electronic element, an absorber layer comprising a material that reduces Eddy currents and a second adhesive layer positioned between the first plastic layer and the absorber layer wherein the absorber layer is arranged below the first adhesive layer.

In some embodiments, the electronic element is a radio frequency identification (RFID) chip and antenna.

In some embodiments, the material that reduces Eddy currents is a magnetically soft and/or high permeable material selected from the group consisting of rare earth metals, ferrites, cobalt/neodymium compounds and combinations thereof.

In some embodiments, a second plastic layer is arranged between the absorber layer and the first adhesive layer. In these embodiments, the second plastic layer comprises a material selected from the group consisting of polyvinyl chloride, polyethylene terephthalate, polyester and acrylonitrile-butadiene-styrene.

The invention, in another aspect, features a plastic card comprising a plastic card prelaminate, at least one third plastic sheet arranged adjacent to the first plastic sheet and at least one fourth plastic sheet arranged adjacent to the second plastic sheet. In these embodiments, each of the third plastic sheet and the fourth plastic sheet comprises a material selected from the group consisting of polyvinyl chloride, polyethylene terephthalate, polyester and acrylonitrile-butadiene-styrene. In some embodiments, a defined area is pre-cut via cut-lines and each cut-line extends through the third plastic sheet, the first plastic sheet, the first adhesive layer and the release layer.

In some embodiments, the plastic card prelaminate of the plastic card comprises a composite structure, a defined area is pre-cut via cut-lines and each cut-line extends through the third plastic sheet, the first plastic layer, the second adhesive layer, the absorber layer, the first adhesive layer and the release layer.

The plastic card can be cut via the method described herein to produce a pre-cut plastic card. In such embodiments, the laser barrier layer prevents the laser beam from cutting through the second plastic sheet. This allows the plastic card to be cut through the third plastic sheet, the first plastic sheet and the first adhesive layer and into the release layer without cutting through the second plastic sheet.

In some embodiments, the defined area includes the at least one electronic element of the plastic card prelaminate. In some embodiments, the plastic card is pre-cut in an area defining a phone sticker or a metal-compatible contactless sticker.

In some embodiments, the plastic card is pre-cut through the third plastic sheet, the first plastic sheet and the first adhesive layer and into the release layer. In some embodiments, the plastic card is pre-cut through the third plastic sheet, the plastic layer, the second adhesive layer, the absorber layer and the first adhesive layer and into the release layer.

Other aspects and advantages of the invention will become apparent from the following detailed description taken in conjunction with accompanying drawings illustrating the principals of the invention by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DETAILED DESCRIPTION

Figure 2:
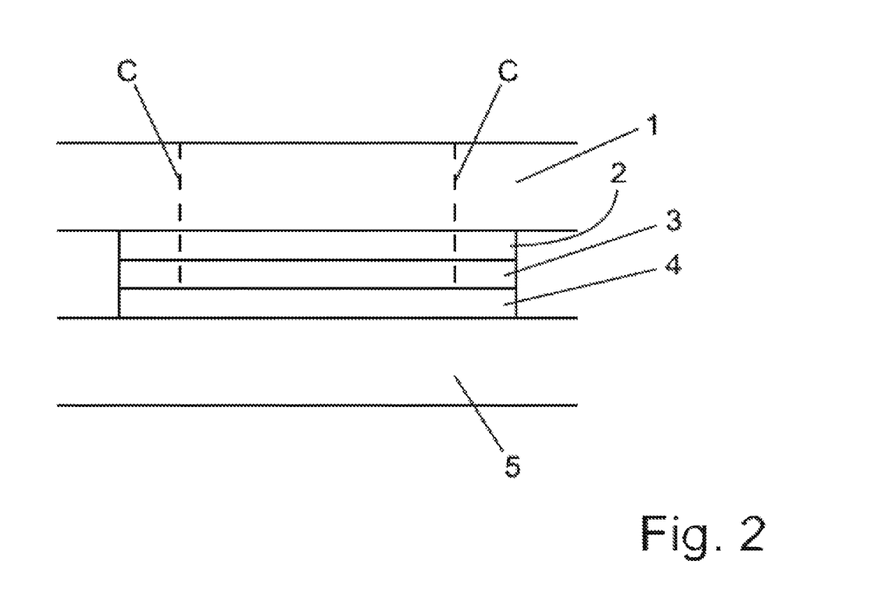
FIG. 2 shows a cross sectional view of a pre-cut plastic card according to an embodiment of the invention.

FIG. 2 shows a pre-cut plastic card according to a first embodiment of the invention. The plastic card consists of a top plastic sheet 1, an adhesive layer 2, a release layer 3, a laser barrier layer 4 and a bottom plastic sheet 5. A laser beam is used to cut cut-lines C through the first plastic sheet 1 and the adhesive layer 2 and into the release layer 3. The laser barrier layer 4 prevents the laser from cutting further through the laser barrier layer 4 and the second plastic sheet 5. The area defined by the cut-lines C may be removed from the plastic card by a user to obtain a label. The cut-out part of the first plastic sheet 1 and the adhesive layer 2 is separable from the release layer 3 and used to stick the cut-out part of the first plastic sheet 1 onto a surface. Pre-cutting the plastic card using a laser results in an even surface of the plastic card so that it may be printed after pre-cutting.

Generally, it is possible to use the techniques described herein to pre-cut a conventional plastic card that does not comprise a laser barrier layer 4. In this embodiment, the laser may cut through the whole plastic card so that a label may be punched out of the plastic card.

Figure 3:
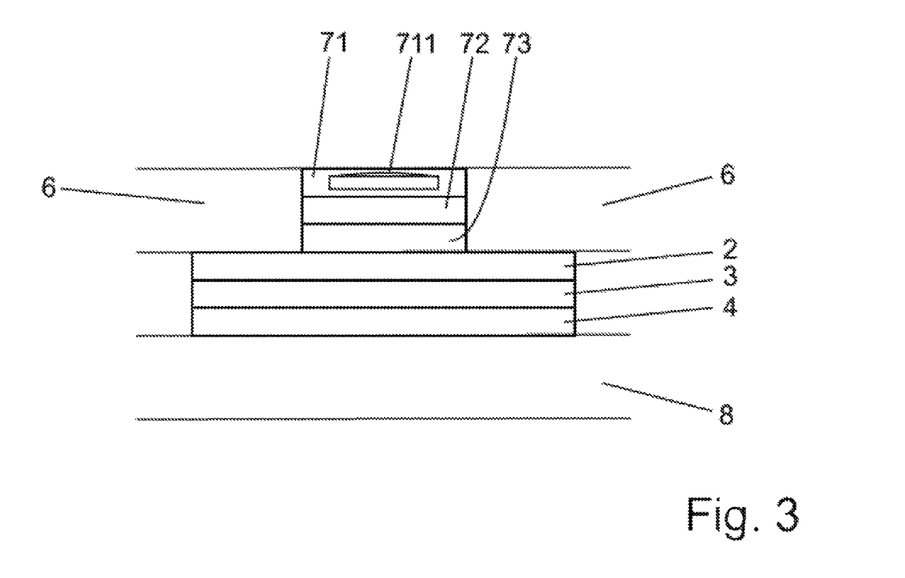
FIG. 3 shows a cross sectional view of a plastic card prelaminate according to an embodiment of the invention.
Figure 4:
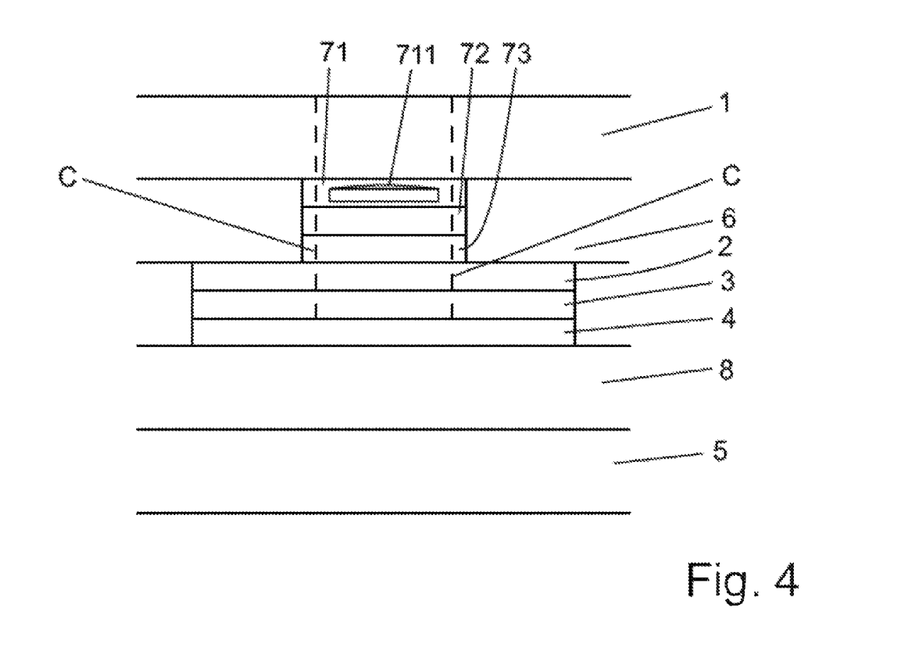
FIG. 4 shows a cross sectional view of an embodiment of a pre-cut plastic card including a plastic card prelaminate according to FIG. 3.
Figure 5:
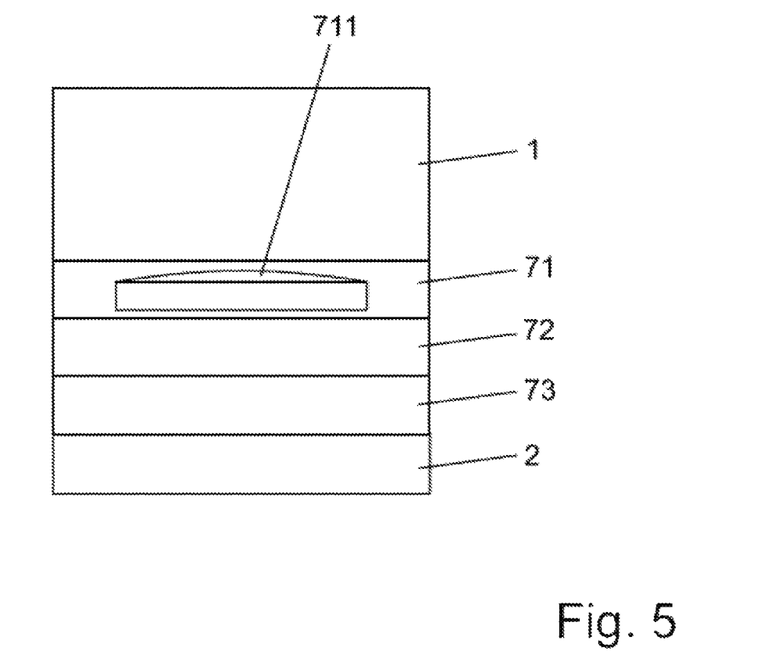
FIG. 5 shows a cross sectional view of a phone sticker separated from the plastic card according to FIG. 4.

In a second embodiment of the invention shown in FIGS. 3 and 4, a plastic card prelaminate is provided to produce a plastic card that is pre-cut using the method described herein. The plastic card prelaminate comprises a first plastic sheet 6 including a through-hole, an adhesive layer 2, a release layer 3, a laser barrier layer 4 and a second plastic sheet 8. A composite structure is arranged in the through-hole. The composite structure comprises a first plastic layer 71 including an RFD chip and antenna 711, an absorber layer 73 comprising a material that reduces Eddy currents and a second adhesive layer 72 positioned between the first plastic layer 71 and the absorber layer 73. To produce a plastic card, a top plastic sheet 1 (shown in FIG. 4) is positioned on top of the first plastic sheet 6 as a third plastic sheet that covers both the first plastic sheet 6 and plastic layer 71. A bottom plastic sheet 5 is arranged on the second plastic sheet 8 as a fourth plastic sheet. That plastic card is pre-cut using a laser where the cut-lines C produced by the laser beam extend through the top plastic sheet 1, the first plastic layer 71, the second adhesive layer 72, the absorber layer 73 and the first adhesive layer 2 and into the release layer 3. Further cutting through the plastic card is prevented by the laser barrier layer 4. A phone sticker that can be separated from the plastic card is shown in FIG. 5.

Figure 6:
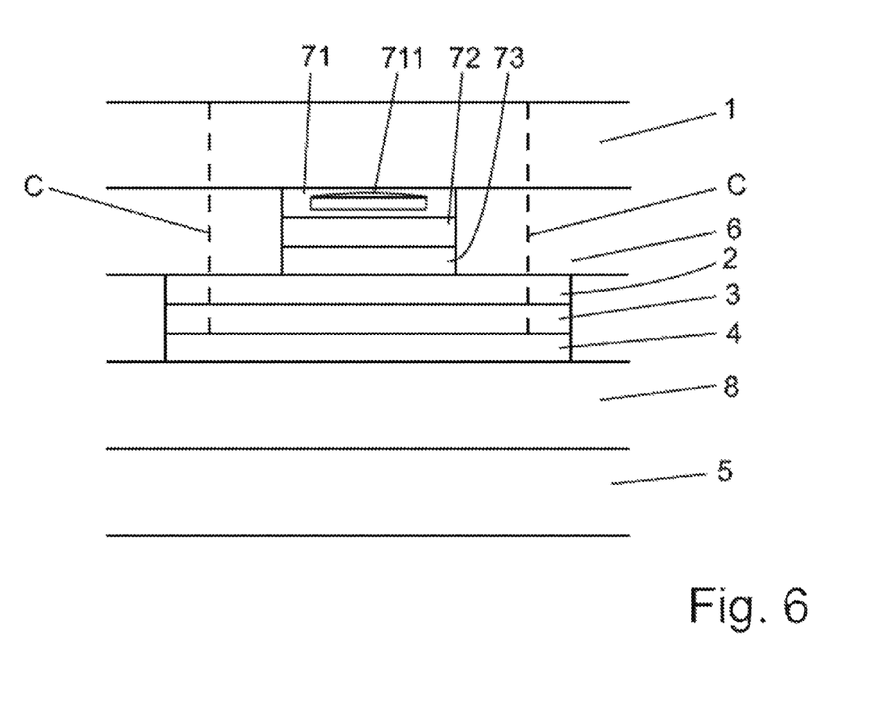
FIG. 6 shows a cross sectional view another embodiment of a pre-cut plastic card including a plastic card prelaminate according to FIG. 3.
Figure 7:
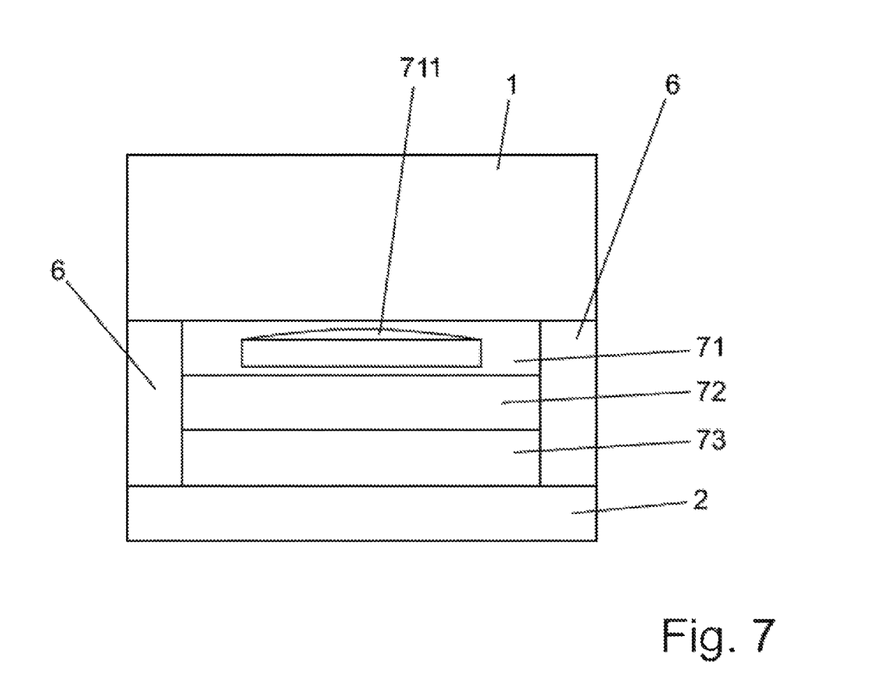
FIG. 7 shows a cross sectional view of a phone sticker separated from the plastic card according to FIG. 6.

In a third embodiment of the invention shown in FIG. 6, a plastic card is produced by positioning a top plastic sheet 1 on top of the first plastic sheet 6 as a third plastic sheet that covers that first plastic sheet 6 and the first plastic layer 71. A bottom plastic sheet 5 is arranged on the second plastic sheet 8 as a fourth plastic sheet. The plastic card is pre-cut using a laser wherein the cut-lines C produced by the laser beam extend through the top plastic sheet 1, the first plastic sheet 6 and the first adhesive layer 2 and into the release layer 3. Further cutting through the plastic card is prevented by the laser barrier layer 4. A phone sticker that can be separated from the plastic card is shown in FIG. 7. In contrast to the phone sticker of the second embodiment of the invention, the sides of the first plastic layer 1 are protected by the material of the first plastic sheet 6.

Figure 8:
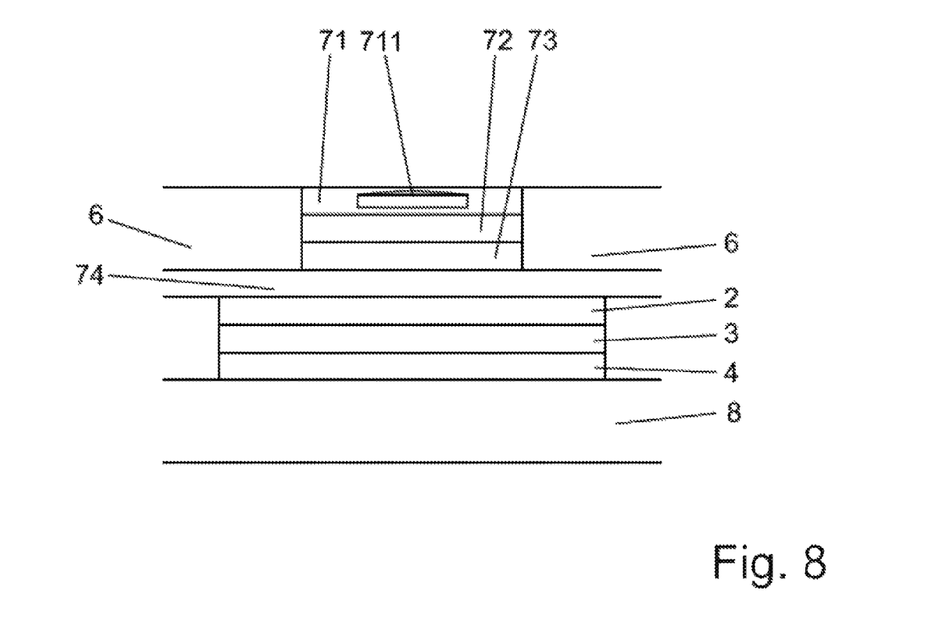
FIG. 8 shows a cross sectional view of a plastic card prelaminate according to another embodiment of the invention.
Figure 9:
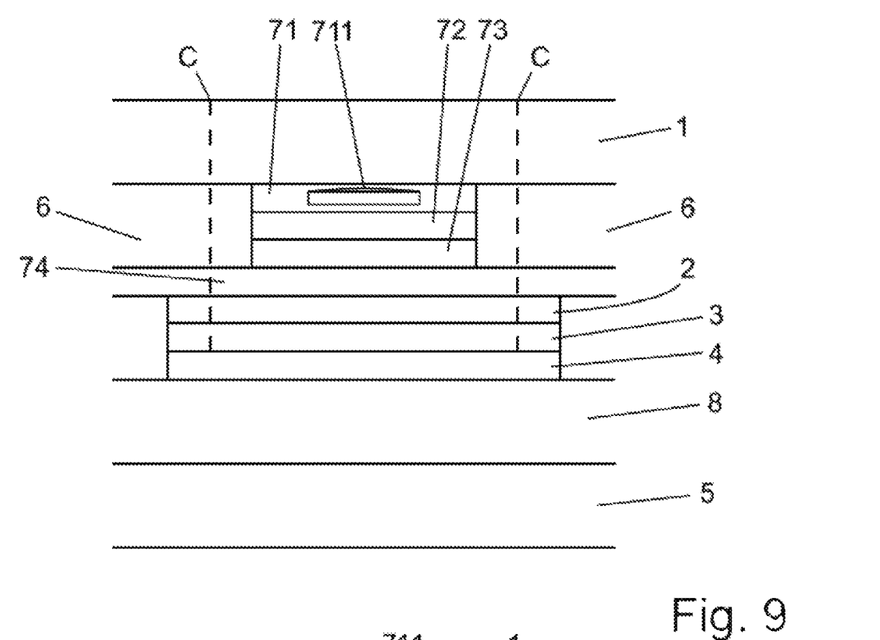
FIG. 9 shows a cross sectional view of a pre-cut plastic card including a plastic card prelaminate according to FIG. 8.
Figure 10:
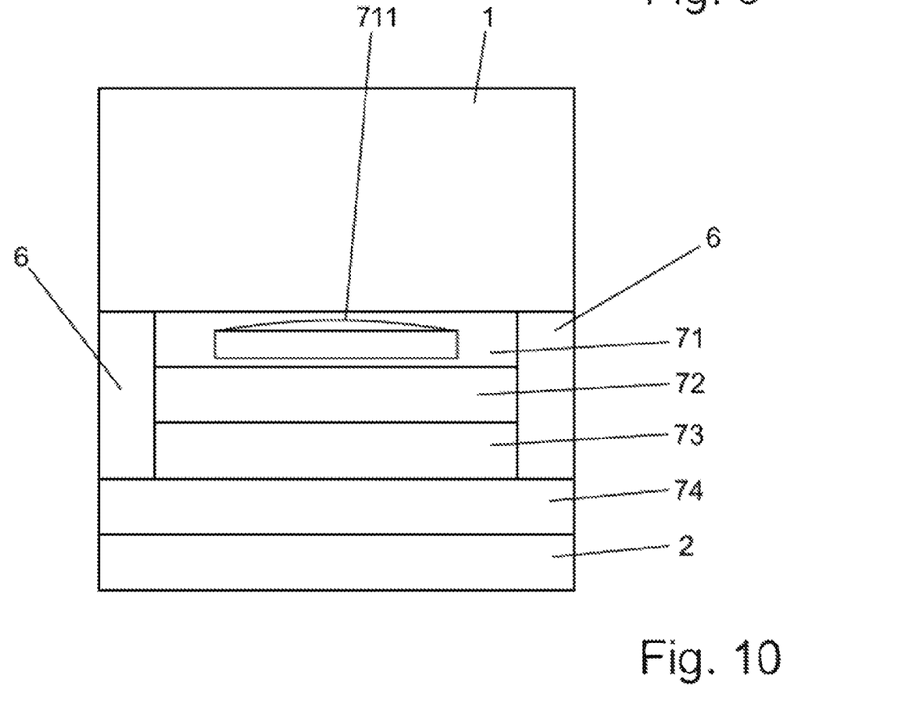
FIG. 10 shows a cross sectional view of a phone sticker separated from the plastic card according to FIG. 9.

In a fourth embodiment of the invention shown in FIGS. 8 and 9, a second plastic sheet 74 is arranged between the absorber layer 73 and the first adhesive layer 2. Instead of producing a pre-cut plastic card by cutting through the first plastic layer 71, the second adhesive layer 72 and the absorber layer 73 as described in the second embodiment of the invention, this plastic card is cut through the first plastic sheet 6 using a laser, resulting in cut-lines C extending through the top plastic sheet 1, the first plastic sheet 6, the second plastic layer 74 and the adhesive layer 2 and into the release layer 3. Further cutting is prevented by the laser barrier layer 4. A phone sticker that can be separated from the plastic card is shown in FIG. 10. In contrast to the phone stickers of the second and third embodiments of the invention, the first plastic layer 71 and the absorber layer 73 are completely enclosed in the plastic material of the top plastic sheet 1, the first plastic sheet 6 and the second plastic layer 74.

Figure 11:
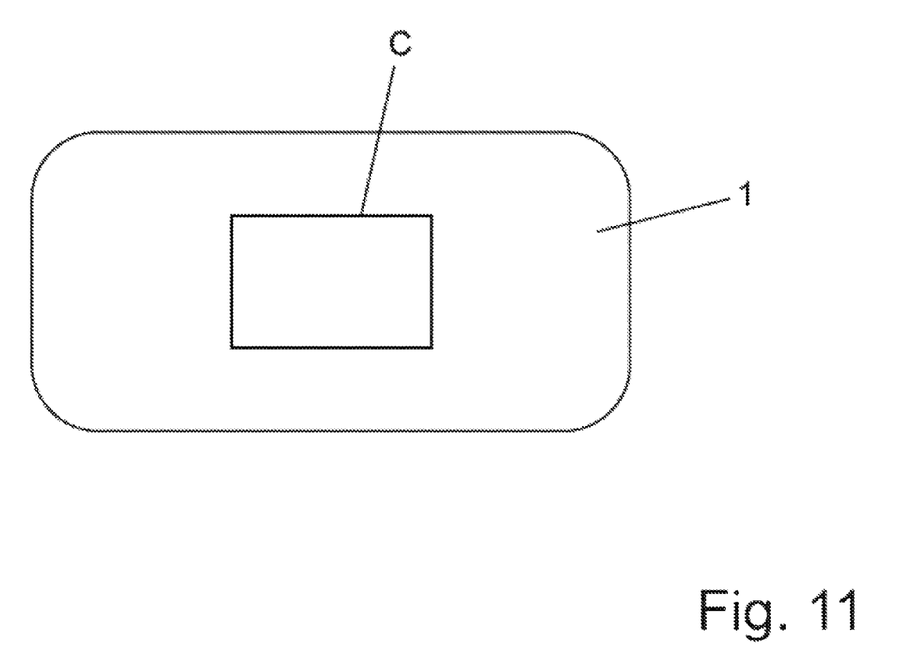
FIG. 11 shows a top view of a pre-cut plastic card according to an embodiment of the invention.

A top view of a plastic card produced according to any of the described embodiments of the invention is shown in FIG. 11. An area of the plastic card that may be cut out of the plastic card is defined by the cut-line C. The area can be used as a label. In embodiments of the invention where the area comprises an RFID-chip and antenna 711, the label can be used as a phone sticker or a metal-compatible contactless sticker.

One skilled in the art will realize the invention may be embodied in other specific forms without departing from the spirit or essential characteristics thereof. The foregoing embodiments are therefore to be considered in all respects illustrative rather than limiting of the invention described herein.

What is claimed is:

1. A plastic card prelaminate comprising:
   a first plastic sheet;
   a first adhesive layer arranged below the first plastic sheet;
   a release layer arranged below the first adhesive layer;
   a laser barrier layer arranged below the release layer; and
   a second plastic sheet arranged below of the laser barrier layer.

2. The plastic card prelaminate of claim 1, wherein the laser barrier layer comprises a material selected from the group consisting of aluminum and metalized plastic.

3. The plastic card prelaminate of claim 1, wherein each of the first plastic sheet and the second plastic sheet comprises a material selected from the group consisting of polyvinyl chloride, polyethylene terephthalate, polyester and acrylonitrile-butadiene-styrene.

4. The plastic card prelaminate of claim 1, wherein the release layer comprises a material selected from the group consisting of silicones and teflon.

5. The plastic card prelaminate of claim 1, wherein the first adhesive layer comprises a pressure sensitive adhesive.

6. The plastic card prelaminate of claim 1, wherein a composite structure is arranged in a through-hole of the first plastic sheet, the composite structure comprising:
   a) a first plastic layer including at least one electronic element,
   b) an absorber layer comprising a material that reduces Eddy currents, and
   c) a second adhesive layer positioned between the first plastic layer and the absorber layer;
   wherein the absorber layer is arranged on below the first adhesive layer.

7. The plastic card prelaminate of claim 6, wherein the electronic element is a radio frequency identification (RFID) chip and antenna.

8. The plastic card prelaminate of claim 6, wherein the material that reduces Eddy currents is a magnetically soft and/or high permeable material selected from the group consisting of rare earth metals, ferrites, cobalt/neodymium compounds and combinations thereof.

9. The plastic card prelaminate of claim 6, wherein the second adhesive layer comprises a pressure sensitive adhesive.

10. The plastic card prelaminate of claim 6, wherein a second plastic layer is arranged between the absorber layer and the first adhesive layer.

11. The plastic card prelaminate of claim 10, wherein the second plastic layer comprises a material selected from the group consisting of polyvinyl chloride, polyethylene terephthalate, polyester and acrylonitrile-butadiene-styrene.

12. A plastic card comprising:
    a plastic card prelaminate of claim 6;
    at least one third plastic sheet arranged adjacent to the first plastic sheet and adjacent to the plastic layer; and
    at least one fourth plastic sheet arranged adjacent to the second plastic sheet.

13. The plastic card of claim 12, wherein each of the third plastic sheet and the fourth plastic sheet comprises a material selected from the group consisting of polyvinyl chloride, polyethylene terephthalate, polyester and acrylonitrile-butadiene-styrene.

14. The plastic card of claim 12, wherein a defined area is pre-cut via cut-lines and each cut-line extends through the third plastic sheet, the first plastic sheet and, the first adhesive layer and into the release layer.

15. The plastic card of claim 12, wherein a defined area is pre-cut via cut-lines and each cut-line extends through the third plastic sheet, the first plastic layer, the second adhesive layer, the absorber layer and the first adhesive layer and into the release layer.

16. The plastic card of claim 12, wherein a second plastic layer is arranged between the absorber layer and the first adhesive layer and wherein a defined area is pre-cut via cut-lines and each cut-line extends through the third plastic sheet, the first plastic sheet, the second plastic layer and the first adhesive layer and into the release layer.

17. A plastic card comprising:
    the plastic card prelaminate of claim 1;
    at least one third plastic sheet arranged adjacent to the first plastic sheet; and
    at least one fourth plastic sheet arranged adjacent to the second plastic sheet.

18. The plastic card of claim 17, wherein each of the third plastic sheet and the fourth plastic sheet comprises a material selected from the group consisting of polyvinyl chloride, polyethylene terephthalate, polyester and acrylonitrile-butadiene-styrene.

19. The plastic card of claim 17, wherein a defined area is pre-cut via cut-lines and each cut-line extends through the third plastic sheet, the first plastic sheet and the first adhesive layer and into the release layer.

* * * * *

UNITED STATES PATENT AND TRADEMARK OFFICE
CERTIFICATE OF CORRECTION

PATENT NO.         : 9,090,044 B2
APPLICATION NO.    : 13/934871
DATED              : July 28, 2015
INVENTOR(S)        : Werner Vogt

It is certified that error appears in the above-identified patent and that said Letters Patent is hereby corrected as shown below:

On the title page, item (54), and in the specification, column 1, line 1, delete the title: "Plastic Card Prelaminate and Plastic Card Structure"

and insert the title: --Method for Manufacturing a Pre-Cut Plastic Card via Laser Cutting, Having a Plastic Card, Plastic Card Prelaminate and Sticker Separable from the Plastic Card Structure--

Signed and Sealed this
Twenty-ninth Day of December, 2015

Michelle K. Lee
*Director of the United States Patent and Trademark Office*